United States Patent [19]

Davies et al.

[11] Patent Number: 4,662,713
[45] Date of Patent: May 5, 1987

[54] OPTICAL FIBER CONNECTOR AND ARTICLES CONNECTED THEREWITH

[75] Inventors: Scott T. Davies, Doraville; Paul F. Gagen, Duluth; Nathan E. Hardwick, III, Dunwoody, all of Ga.

[73] Assignee: American Telephone and Telegraph Company AT&T Bell Laboratories, Murray Hill, N.J.

[21] Appl. No.: 639,946

[22] Filed: Aug. 13, 1984

[51] Int. Cl.$^4$ .......................... G02B 6/36; G02B 6/40
[52] U.S. Cl. ................ 350/96.20; 350/96.21; 350/96.22; 350/96.24
[58] Field of Search ............... 350/96.10, 96.20, 96.21, 350/96.22, 96.34, 96.24; 156/158

[56] References Cited

U.S. PATENT DOCUMENTS

| | | | |
|---|---|---|---|
| 3,912,574 | 10/1975 | Cherin et al. | 156/502 |
| 4,028,162 | 6/1977 | Cherin et al. | 156/158 |
| 4,046,454 | 9/1977 | Pugh, III | 350/96.21 X |
| 4,146,301 | 3/1979 | Cherin et al. | 350/96.21 |
| 4,252,407 | 2/1981 | Bubanko et al. | 350/96.21 |
| 4,265,689 | 5/1981 | Jeffrey | 350/96.20 |

OTHER PUBLICATIONS

GTE Products Literature on Elastomeric Splice, "Sylvania Connector Products" 2 pp. (No date).

*Primary Examiner*—William L. Sikes
*Assistant Examiner*—Brian M. Healy
*Attorney, Agent, or Firm*—Eugen E. Pacher

[57] ABSTRACT

An optical fiber connector of the continuous groove type comprising a substrate with a multiplicity of fiber-receiving grooves thereon, and a cover member comprising compliant fiber-contacting material having a modulus of elasticity less than about $10^6$ psi (less than about 6.9 GPa), preferably less than $10^5$ psi. Connectors according to the invention can have low loss, and low added loss during thermal cycling. In a particular preferred embodiment, the substrate is a molded plastic part, and the compliant material is an adhesive-backed polyester film.

12 Claims, 5 Drawing Figures

OPTICAL FIBER CONNECTOR AND ARTICLES CONNECTED THEREWITH

FIELD OF THE INVENTION

This invention relates to optical fiber connectors.

BACKGROUND OF THE INVENTION

Optical fiber communication systems are rapidly being commercialized. Essentially all such systems require means for catenating fibers, and such means will be referred to herein as connectors.

The industry has expended a substantial effort to develop fiber connectors, and this effort has resulted in disclosure of a variety of connector types. One of these types, to be referred to as the continuous groove connector, comprises fiber-receiving grooves in a substantially plane substrate, with pairs of fibers to be connected placed end to end into the grooves, and maintained therein by a cover member. U.S. Pat. Nos. 3,912,571 and 4,028,162, both co-assigned with this, disclose respectively a continuous groove connector and a method for splicing fiber by means of the connector. U.S. Pat. No. 4,146,301, also coassigned with this, incorporated herein by reference, discloses a continuous groove connector with vacuum slots.

Optical fiber connectors typically are expected to meet several demanding criteria. Among these are low loss and good thermal stability, i.e., little added loss due to temperature changes. Other criteria of interest are rapid and easy assembly requiring little skill, and low cost. Among the above criteria, at least achievement of thermal stability has proven problematical in prior art continuous groove connectors.

Because connectors of the continuous groove type are potentially very desirable for a variety of applications, especially for splicing ribbon cables, a continuous groove connector that has good thermal stability, while also possessing the other desirable characteristics referred to above, would be of substantial interest. This application discloses such a connector.

SUMMARY OF THE INVENTION

The inventive optical fiber connector comprises a substrate, at least one cover member, and means for securing the cover member to the substrate. The substrate comprises at least one fiber-receiving groove into which a portion of a first optical fiber and a portion of a second optical fiber are to be placed such that an end of the first fiber is facing an end of the second fiber. The cover member comprises material which is to be in contact with at least the first fiber, the material to be termed fiber-contacting material, the fiber-contacting material being compliant, having a modulus of elasticity that is less than about $10^6$ psi (less than about 6.9 GPa), typically less than about $2 \cdot 10^5$ psi, preferably less than $10^5$ psi, at 25° C. The optical fiber connector also comprises cover-securing means adapted for urging the cover member towards the substrate such that the fiber-contacting material is maintained in contact with the fibers.

In preferred embodiments of the invention, the cover member comprises a backing member comprising material having a modulus of elasticity that is substantially greater than the modulus of the fiber-contacting material, with the fiber-contacting material attached to the backing member. The fiber-contacting material is, for instance, an adhesive-backed polymeric film, e.g., a polyester film. Also, the substrate preferably comprises a groove member having a multiplicity of substantially parallel fiber-receiving grooves, the grooved member also consisting substantially of material having a modulus of elasticity substantially greater than the modulus of the fiber-contacting material, e.g., a molded plastic member.

The cover member typically comprises means for introducing index-matching material between the end faces of the fibers held in the grooves, and the substrate can comprise means for supplying air suction to the grooves, to urge the fibers into the grooves during the process of making the connection.

The inventive connector can advantageously be used to connect linear arrays of fibers, e.g., ribbon cable, but is not so limited, since it can also be used to connect a single fiber pair, as well as to connect fibers from standed multifiber cables. It can be used to provide temporary connections, as may be desirable in case of damage to a fiber cable, or to provide permanent connections. Furthermore, it can be used to connect long haul fibers, or to connect fibers in local area networks (LAN) or other relatively short haul applications. It is asvantageously used to connect multimode fibers, but is not so limited.

Disclosed is also a combination comprising a first optical fiber cable comprising at least a first optical fiber, a second optical fiber cable comprising at least a second optical fiber, and an optical fiber connector, the first optical fiber and the second optical fiber secured to the optical fiber connector, with the optical fiber connector being of the above-described type. In the combination according to the invention, a portion of the first optical fiber and a portion of the second optical fiber are positioned in a fiber-receiving groove such that an end of the first optical fiber is facing an end of the second optical fiber. Preferably the ends are maintained spaced apart, advantageously between about $10^{-4}$ and about $10^{-3}$ inches (2.5 μm to 25 μm) apart at 25° C., with index-matching material substantially filling the space between the fiber ends. The index-matching material advantageously has a relatively low elastic modulus, typically less than one-tenth the elastic modulus of the optical fiber material, preferably less than about $10^3$ psi (6.9 MPa), measured at 25° C.

The inventive combination can have advantageous properties. For instance, exemplary combinations have had less than 0.1 dB excess loss over the temperature range −40° C. to 77° C. "Excess connector loss" herein is the connector loss at a given temperature minus the connector loss at 25° C.

Unless stated otherwise, numerical parameter values herein are the values at 25° C.

BRIEF DESCRIPTION OF THE DRAWINGS

Identical or analogous features are designated with the same numerals in different Figures.

DETAILED DESCRIPTION OF THE INVENTION

A principal aspect of the inventive connector is the use of a cover member comprising compliant material in contact with optical fibers confined between the substrate and the cover member. Typically, the cover member comprises a relatively rigid backing member, with a laye of compliant material adhering thereto. Use of this compliant layer leads to improved connector characteristics, as compared to prior art connectors lacking the compliant layer.

Typically, both the fiber-receiving grooves in the substrate and the fibers themselves are produced to be within specified limits of nominal design values. A result of these permissible (and unavoidable) departures from the nominal design is a variation in the amount fibers extend above the substrate surface, resulting, in prior art connectors, in unequal loading forces on different fibers within the connector. For instance, the presence of a slightly oversized fiber may prevent the gripping of a smaller nearby fiber, if both substrate and cover are made of rigid material. The use of a compliant intermediate layer can insure that all fibers are properly seated in the substrate grooves, the compliant material acting to compensate for warping or other flaws in the splice cover or substrate, and use of appropriate chosen compliant matieral can ensure that sufficient normal force to prevent slippage is applied to each fiber.

Figure 5:
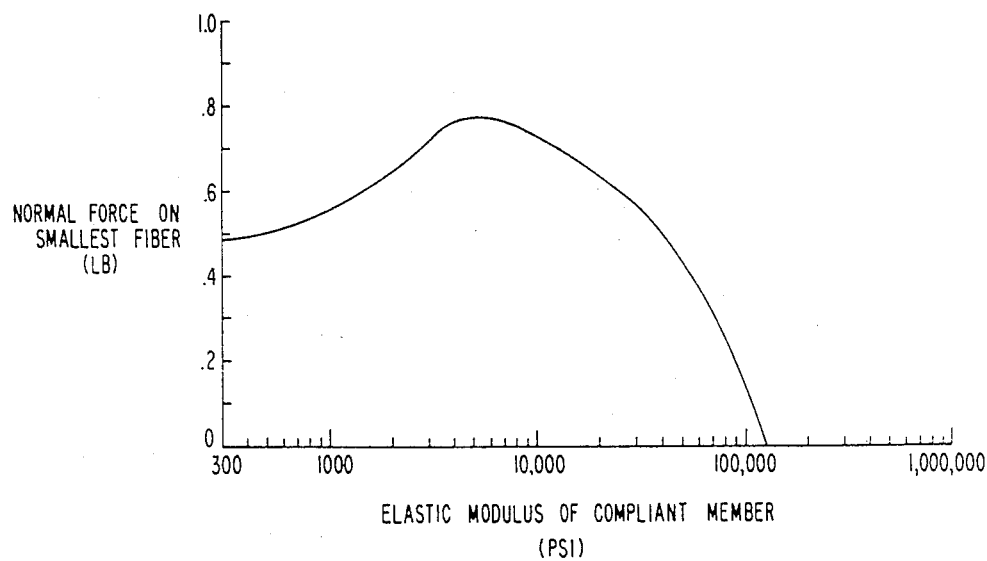
FIG. 5 shows an exemplary computed curve of the gripping force on a fiber vs. the elastic modulus of the fiber-containing compliant material.

FIG. 5 shows the calculated relationship between the elastic modulus of the compliant material and the normal force resulting on the smallest fiber in an array of fibers, with the smallest fiber assumed located adjacent to the largest fiber in the array, the difference in fiber diameters assumed to be the largest difference allowed under the specifications for a certain commercially available 125 $\mu$m diameter multimode fiber ($\pm 2$ $\mu$m). FIG. 5 is exemplary only, since the details of the relationship between modulus and force obviously depend on the assumptions used, including the allowable fiber diameter variations, and the force urging the cover towards the substrate. However, FIG. 5 clearly shows that the gripping force has a maximum value at some intermediate modulus value, in the exemplary case at a modulus of about 5,000 psi.

The modulus of elasticity is not the only parameter of the fiber-contacting material that is of interest. The surface of the compliant member should have significant friction, typically an effective coefficient of friction of at least about 0.25, with the optical fibers in contact therewith. If desired, a compliant member having a "sandpaper" surface structure can be used. This typically increases the effective coefficient of friction. For instance, we have used polyester films with 1-8 $\mu$m SiC particles adhering to the surface. Particles could of course also be embedded in the material so as to protrude, at least partially, from the surface.

A further significant aspect of connectors according to the invention is their potential for low added loss during temperature cycling. Analysis of a model of the connector indicates that, at temperatures other than the temperature ($T_o$, typically about 25° C.) at which the connection was originally made, the longitudinal stress in the splice interface region is proportional to the elastic modulus of the material between the fiber end faces (typically index-matching material), and inversely proportional to the gap between the fiber end faces at $T_o$. The stress is also a function of the differences between the thermal expansion coefficients of the fiber, the substrate, and the interface material. The analysis suggests that it is advantageous to use interface material having a relatively low elastic modulus, typically less than one-tenth of the elastic modulus of the optical fiber material preferably less than about 6.9 MPa at 25° C. We have, for instance, used silicon gel index-matching material (GE 6159, RTV silicone gel, available from the General Electric Company).

The analysis also suggests that it is advantageous to have finite spacing between the fiber end faces at $T_o$, typically between about 2.5 $\mu$m and about 25 $\mu$m, and that the fiber gripping length advantageously is kept to a minimum, consistent with the longitudinal load requirements. In an exemplary design the gripping length was about 5 mm.

Figure 1:
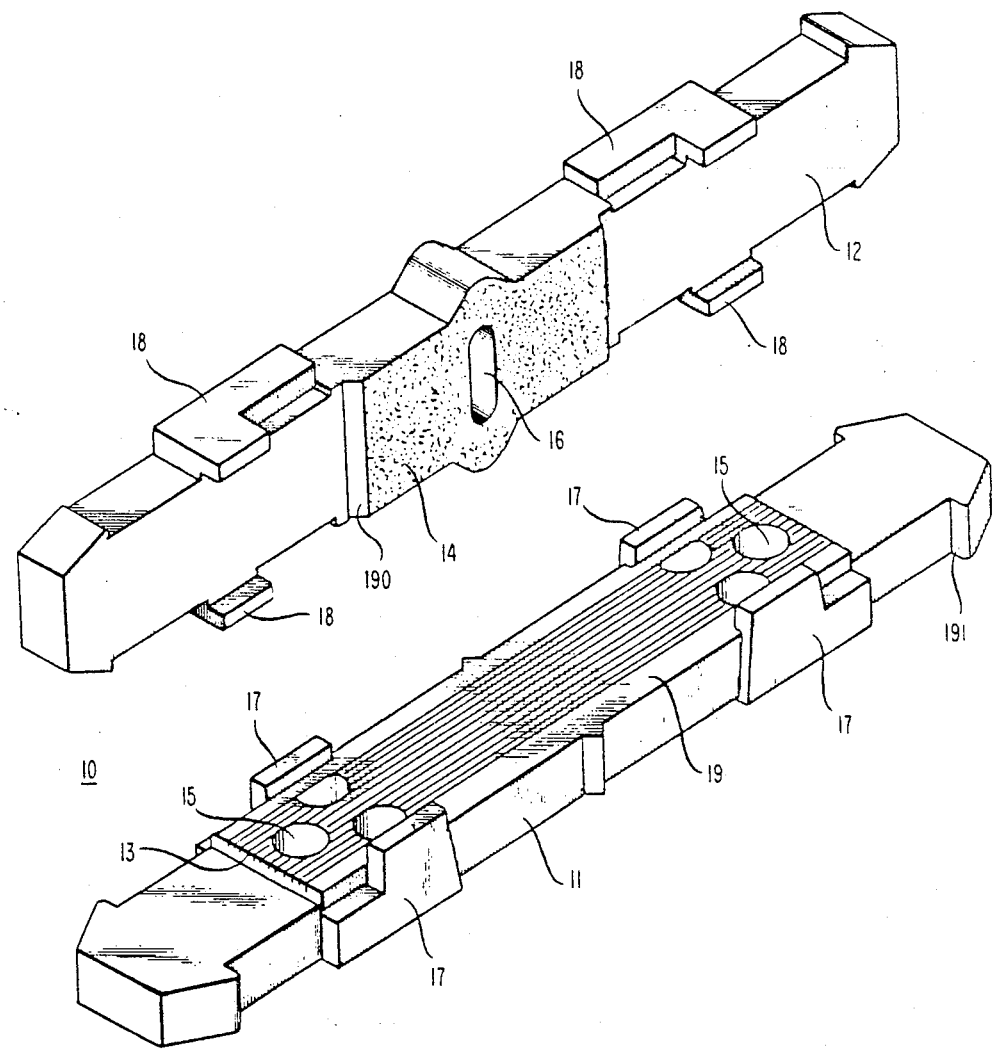
FIG. 1 shows substrate and cover of an exemplary connector according to the invention.

We will next describe an exemplary and preferred embodiment of the invention. FIG. 1 shows a connector 10 comprising grooved substrate 11 and cover 12. The substrate comprises a multiplicity (e.g., 12) of fiber-receiving grooves 13, typically having basically triangular or trapezoidal cross section, of a size and depth to ensure that the fibers extend above grooved substrate surface 19. The substrate also comprises vacuum openings 15 which are used to supply air suction to the fibers, whereby movement of the fibers into the grooves is assisted, and the fibers are maintained in their respective grooves during connector assembly. Cover 12 comprises a raised portion 190, with a layer of compliant material 14 thereon. Slot 16 permits introduction of index-matching material during or after connector assembly. Interlocking members 17 and 18 serve to provide initial alignment between substrate and cover. Both ends of both substrate and cover are shaped to permit insertion of the members into a ribbon termination member, to be shown below, with rigdes 191 permitting locking of the ribbon termination members to the connector members. In this preferred embodiment both substrate and cover are glass-filled molded plastic parts. In particular, we used, inter alia, RYTON, a polyphenylene sulfide available from Phillips Petroleum Company of Bartlesville, Okla. This material has a modulus of elasticity of about $1.2 \cdot 10^6$ psi.

Figure 2:
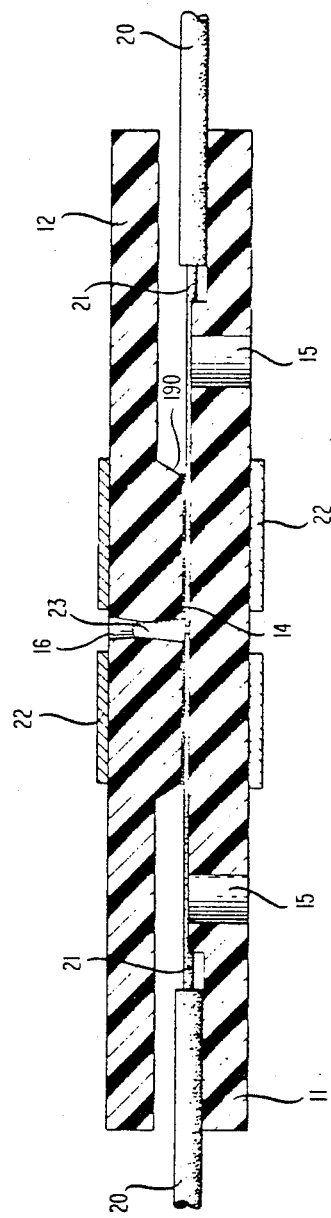
FIG. 2 schematically depicts an exemplary connector in cross section.

FIG. 2 schematically shows a cross-sectional view of an assembled connector according to the invention. Optical fiber ribbon 20 comprises optical fibers 21 and protective material, the protective material being removed from a portion of the ribbon. Stripped fibers 21 are placed into the fiber-receiving grooves in substrate 11, such that the end faces of the fibers are facing each other, the interface located near the center line of the substrate. Cover 12, with compliant material 14 adhering to raised portion 190 of the cover, is placed onto the substrate, thereby confining the fibers. Vacuum openings 15 are used to apply suction to the fibers during assebly. Two elastic clips 22 urge the cover towards the substrate, thereby providing fiber gripping force. The cover comprises slot 16 for introducing index matching material 23 into the fiber joint region, including the space between the opposed fiber end faces. Index matching material is advantageously introduced after assembly of the connector, to prevent its wetting of contacting surfaces.

Figure 3:
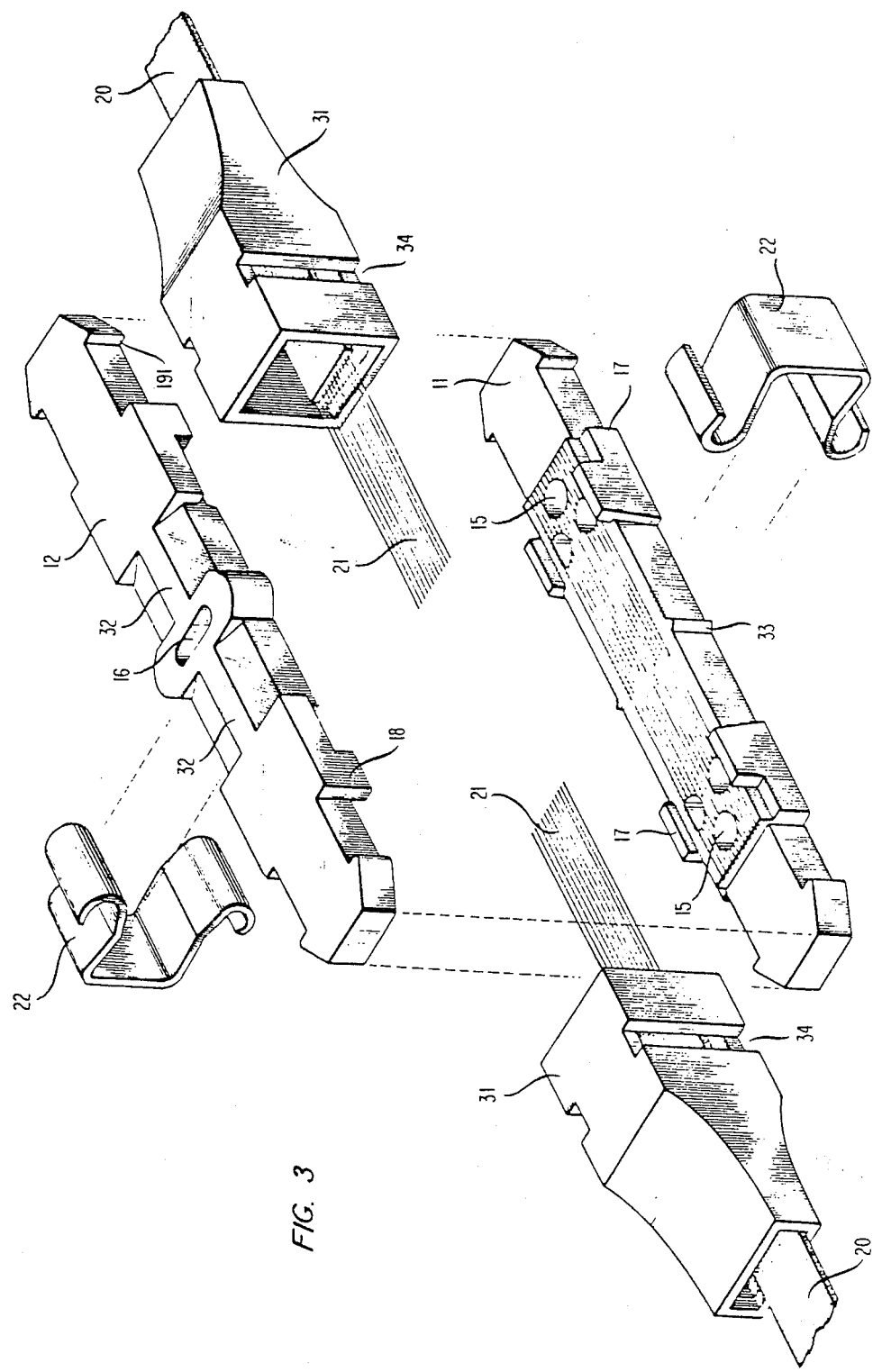
FIG. 3 shows an exemplary connector in exploded view.

FIG. 3 schematically shows an exploded view of a substantially complete optical fiber ribbon connector according to the invention. An end of ribbon 20 is inserted into ribbon terminus piece 31, the protective material stripped from an appropriate length of the optical fiber ribbon, the fibers scribed and broken (and/or polished), by means known to those skilled in the art such as to be of substantially equal length, and the fibers 21 placed into the fiber-receiving grooves of substrate 11, preferably by means of air suction provided through 15 by vacuum generating means not shown. The substrate center line is marked by marker 33, and the fiber ends are to be positioned, typically with the aid of a microscope, so as to be substantially at the substrate center line with e.g., about 12 μm between the fiber end faces. After placing cover 12 atop the substrate, and sliding spring fasteners 22 over cover and substrate such that the fasteners contact the cover at loading ridges 32, index-matching material is introduced into slot 16, and the connector assembly inserted into ribbon termination pieces 31, such that ridges 191 are resting in cutouts 34, providing strain relief for flexing forces.

Figure 4:
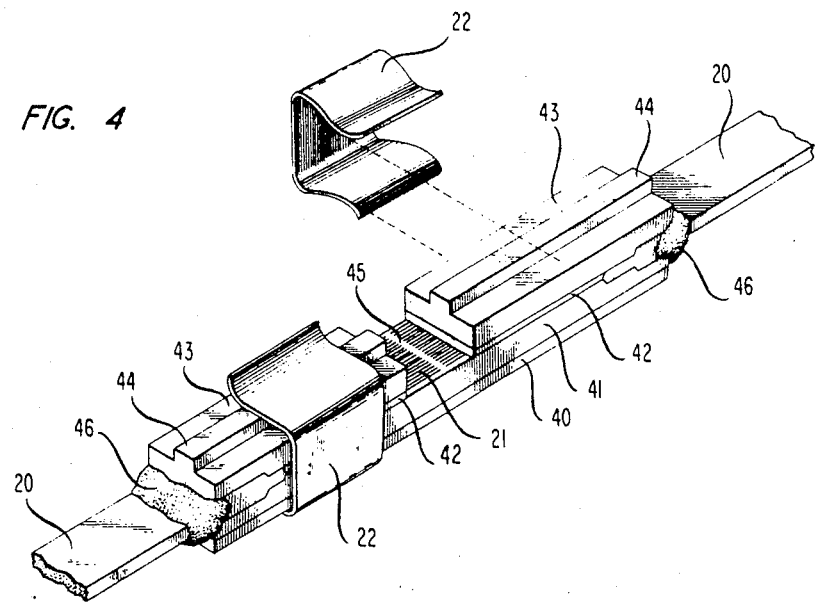
FIG. 4 schematically depicts a further connector according to the invention.

As indicated previously, the above embodimnt, although preferred, is exemplary only. A different exemplary embodiment is shown in FIG. 4. The substrate comprises a backing member 40, e.g., an INVAR plate, with a grooved member 41 thereon. (INVAR is the trademark for a well-known alloy having low thermal expansion.) A grooved member can be molded plastic, or any other appropriate material, e.g., a silicon chip with grooves etched therein. Two substantially identical cover members, each comprising a backing member 43, e.g., an INVAR member with a loading ridge 44 thereon, and compliant layer 42, are pressed against fibers 21 and the substrate surface by means of spring fasteners 22. As described above, fiber-protective material is removed from an appropriate length of fiber ribbon cable 20, the exposed fibers trimmed and placed into the fiber-receiving grooves of the substrate, held in place by means of cover members and spring fasteners, with the fiber junction 45 coated with index matching material, e.g., a UV curvable adhesive of appropriate refractive index, which can also enhance fiber gripping. Adhesive 46 serves to establish a strong bond between the connector members and the fiber ribbons, thereby providing strain relief.

What is claimed is:

1. In combination, a first optical fiber cable comprising at least a first optical fiber, a second optical fiber cable comprising at least a second optical fiber, and an optical fiber connector, the first optical fiber and the second optical fiber secured to the optical fiber connector, the optical fiber connector comprising
   (a) a substrate comprising at least one fiber-receiving groove, an end portion of the first optical fiber and an end portion of the second optical fiber positioned in the groove such that the end of the first optical fiber is spaced from and facing the end of the second optical fiber;
   (b) at least one cover member comprising a relatively non-compliant backing member and a relatively compliant material which is in contact with at least the first fiber, the material to be referred to as the fiber-contacting material, the fiber-contacting material being attached to the backing member;
   (c) cover-securing means adapted for urging the cover member towards the substrate, whereby the fiber-contacting material is maintained in contact with at least the first fiber; and
   (d) means for permitting introduction of an index-matching material between the ends of the first and second fiber;
   characterized in that
   (e) the fiber-contacting material has a modulus of elasticity that is less than about 6.9 GPa at 25° C.; and
   (f) the index-matching has a modulus of elasticity that is less than one-tenth of the modulus of elasticity of the first fiber, such that the optical signal loss associated with the connection between the first and second optical fiber is relatively independent of temperature over a relatively wide temperature range.

2. Combination of claim 1, the substrate comprising a grooved member comprising a multiplicity of substantially parallel, spaced fiber-receiving grooves, the grooved member having a modulus of elasticity greater than the modulus of elasticity of the fiber-contacting material.

3. Combination of claim 1, the distance between the fiber ends being at least about 2.5 μm at 25° C., with index-matching material substantially filling the space between the fiber ends.

4. Combination of claim 3, wherein the cover member comprises the means for permitting introduction of the index-matching material.

5. Combination of claim 1, wherein the fiber-contacting material has an effective coefficient of friction with the first optical fiber of at least 0.25 at 25° C.

6. Combination of claim 5, wherein the fiber-contacting material comprises friction-enhancing particles, the particles adhering to the fiber-contacting material surface, or being at least partially embedded in the fiber-contacting material.

7. Combination of claim 2, wherein the grooved member is a molded plastic member.

8. Combination of claim 7, wherein the backing member and the substrate consist substantially of molded plastic.

9. Combination of claim 1, wherein the second optical fiber has optical signal loss at any temperature in the range from −40° C. to +77° C. is at most 0.1 dB greater than the loss at 25° C.

10. Combination of claim 1, wherein the fiber-contacting material modulus of elasticity is at most 0.69 GPa at 25° C.

11. Combination of claim 1, wherein at least the first optical fiber cable is a ribbon cable.

12. Combination of claim 4, wherein the index-matching material elastic modulus is at most 6.9 MPa at 25° C.

* * * * *